US006066400A

United States Patent [19]

Law et al.

[11] Patent Number: 6,066,400

[45] Date of Patent: May 23, 2000

[54] POLYIMIDE BIASABLE COMPONENTS

[75] Inventors: Kock-Yee Law, Penfield; Gerald M. Fletcher, Pittsford; Ihor W. Tarnawskyj, Webster; Joseph Mammino, Penfield; Martin A. Abkowitz, Webster; Frederick E. Knier, Jr., Wolcott, all of N.Y.

[73] Assignee: Xerox Corporation, Stamford, Conn.

[21] Appl. No.: 08/920,809

[22] Filed: Aug. 29, 1997

[51] Int. Cl.[7] .......................... B32B 15/04; B32B 15/06; B32B 27/08; B32B 27/20

[52] U.S. Cl. .......................... 428/412; 428/323; 428/421; 428/422; 428/457; 428/458; 428/473.5; 399/308; 399/310; 399/313; 399/314

[58] Field of Search .................................... 428/421, 422, 428/323, 412, 473.5, 457, 458; 399/308, 310, 314, 313

[56] References Cited

U.S. PATENT DOCUMENTS

| | | | |
|---|---|---|---|
| 4,435,839 | 3/1984 | Gu et al. | 384/103 |
| 4,546,892 | 10/1985 | Couput | 215/252 |
| 4,831,977 | 5/1989 | Presswood | 123/193 |
| 5,000,875 | 3/1991 | Kolouch | 252/511 |
| 5,017,223 | 5/1991 | Kobayashi | 106/20 |
| 5,037,587 | 8/1991 | Saruwatari et al. | 264/22 |
| 5,112,708 | 5/1992 | Okunuki | 430/31 |
| 5,230,818 | 7/1993 | James et al. | 252/62.55 |
| 5,397,863 | 3/1995 | Afzali-Ardakani et al. | 174/258 |
| 5,448,419 | 9/1995 | Bigelow et al. | 360/17 |
| 5,556,899 | 9/1996 | Afzali-Ardakani et al. | 523/215 |
| 5,571,852 | 11/1996 | Afzali-Ardakani et al. | 523/215 |
| 5,582,886 | 12/1996 | Kitajima et al. | 428/36.91 |
| 5,587,110 | 12/1996 | Yamana et al. | 252/511 |
| 5,591,285 | 1/1997 | Afzali-Ardakani et al. | 156/62.2 |
| 5,618,647 | 4/1997 | Kukimoto | 430/106.6 |
| 5,712,062 | 1/1998 | Yamana et al. | 429/218 |
| 5,753,317 | 5/1998 | Law et al. | 427/487 |
| 5,761,595 | 6/1998 | Tarnawskyj et al. | 399/308 |
| 5,765,085 | 6/1998 | Law et al. | 399/329 |
| 5,795,500 | 8/1998 | Law et al. | 252/511 |
| 5,837,340 | 11/1998 | Law et al. | 428/36.8 |
| 5,848,327 | 12/1998 | Badesha et al. | 399/99 |

FOREIGN PATENT DOCUMENTS 0 531 764 3/1993 European Pat. Off. .

*Primary Examiner*—Vivian Chen

[57] ABSTRACT

A biasable member having a fluorinated carbon filled polyimide layer which exhibits controlled electrical conductivity is disclosed, along with embodiments wherein the fluorinated carbon filled polyimide layer is a substrate, embodiments wherein the fluorinated carbon filled polyimide is a substrate having thereon a filled fluoropolymer outer layer, and embodiments wherein the fluorinated carbon filled polyimide layer is a substrate having thereon an intermediate metal layer, and an outer polymer layer.

35 Claims, 3 Drawing Sheets

POLYIMIDE BIASABLE COMPONENTS

CROSS REFERENCE TO RELATED APPLICATIONS

Attention is directed to copending Application U.S. patent application Ser. No. 08/921,133, filed Aug. 29, 1997, entitled, "Polyimide Intermediate Transfer Components." The disclosure of this application is hereby incorporated by reference in its entirety.

BACKGROUND OF THE INVENTION

The present invention relates to biasable system films for use in an electrostatographic, including digital, apparatus. The biasable system films may be useful as bias charging films, sheets, belts or the like, or bias transfer films, sheets, belts, or the like. The biasable system films comprise a polyimide layer filled with or containing a conductive filler, preferably a fluorinated carbon filler. The present invention provides biasable system films with superior electrical and mechanical properties, including controlled conductivity in a desired resistivity range, and increased mechanical strength, durometer, tensile strength, elongation and toughness. Further, in embodiments, the films also exhibit excellent properties such as statistical insensitivity of conductivity to changes in temperature and humidity, intense continuous corona exposure, corrosive environments, solvent treatment, running time or cycling to high electric fields and back. Also, in embodiments, the layers permit a decrease in contamination of other xerographic components such as photoconductors.

Generally, the process of electrostatographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material such as toner onto the photoreceptive member such that the developing material is attracted to the charged image areas on the photoconductive surface. Thereafter, the developing material, and more specifically toner, is transferred from the photoreceptive member to a copy sheet or to some other image support substrate to create an image which may be permanently affixed to the image support substrate, thereby providing an electrophotographic reproduction of the original document. In a final step in the process, the photoconductive surface of the photoreceptive member is cleaned to remove any residual developing material which may be remaining on the surface thereof in preparation for successive imaging cycles.

Biasable members include both bias transfer members and bias charging members. Toner material can be transferred from a first image support surface (i.e., a photoreceptor) into attachment with a second image support substrate (i.e., a copy sheet) under the influence of electrostatic force fields generated by an electrically biased member, wherein charge is deposited on the second image support substrate by, for example, a bias transfer member or by spraying the charge on the back of the substrate.

An important aspect of the transfer process focuses on maintaining the same pattern and intensity of electrostatic fields as on the original latent electrostatic image being reproduced to induce transfer without causing scattering or smearing of the developer material. This important and difficult criterion is satisfied by careful control of the electrostatic fields, which, by necessity, should be high enough to effect toner transfer while being low enough to not cause arcing or excessive ionization at undesired locations. These electrical disturbances can create copy or print defects by inhibiting toner transfer or by inducing uncontrolled transfer which can easily cause scattering or smearing of the development materials.

Contact charging or bias charging members function by applying a voltage to the charge-receiving member (photoconductive member). Such bias charging members require a resistivity of the entire charging member within a desired range. Specifically, materials with too low resistivities will cause shorting and/or unacceptably high current flow to the photoconductor. Materials with too high resistivities will require unacceptably high voltages. Other problems which can result if the resistivity is not within the required range include low charging potential and non-uniform charging, which can result in poor image quality.

Therefore, it is important in biasable members, that the resistivity be tailored to a desired range and that the resistivity remain within this desired range. Accordingly, it is desirable that the resistivity be unaffected or virtually unaffected to changes in temperature, relative humidity, running time, and leaching out of contamination to photoconductors.

Attempts at maintaining an acceptable transfer field with regard to bias transfer members, have included adding ionic additives to elastomer layers of bias transfer members in an attempt to control the resistivity. U.S. Pat. Nos. 3,959,573 and 3,959,574 both to Seanor et al. describe adding additives such as a quaternary ammonium compound to hydrophobic and hydrophilic elastomeric polyurethane layers, respectively, in order to control the changes in resistivity due to changes in relative humidity. Similarly, U.S. Pat. Nos. 5,286,570, 2,259,990, 2,586,566 and 2,259,989, all to Schlueter, Jr. et al., describe the addition of an asymmetric ionic quaternary ammonium salt to a polyurethane elastomer to extend the useful electrical life of the polyurethane elastomers.

Attempts at controlling resistivity with regard to bias charging members have included adding ionic additives to elastomer layers. European Patent Application 0 596 477 A2, discloses a charging member comprising at least an elastic layer comprising epichlorohydrin rubber and a surface layer disposed thereon, the surface layer comprising at least a semiconductive resin and an insulating metal oxide contained in the semiconductive resin.

However, there are problems associated with the use of such additives. In particular, undissolved particles frequently bloom or migrate to the surface of the polymer and cause an imperfection in the polymer. This leads to nonuniform resistivity, which in turn, causes poor antistatic properties and poor mechanical strength. The ionic additives on the surface may interfere with toner release. Furthermore, bubbles may appear in the conductive polymer, some of which can only be seen with the aid of a microscope, others of which are large enough to be observed with the naked eye. These bubbles provide the same kind of difficulty as the undissolved particles in the polymer, namely poor or non-uniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results are color shifting and color deterioration. Ion transfer also increases the resistivity of the polymer member after repetitive use. This can limit the process and operational latitude and eventually the ion-filled polymer member will be unusable.

Conductive particulate fillers, such as carbon blacks, have also been used in an attempt to control the resistivity.

U.S. Pat. No. 5,112,708 to Okunuki et al., discloses a charging member comprising a surface layer formed of N-alkoxymethylated nylon which may be filled with fluorinated carbon.

U.S. Pat. No. 5,000,875 to Kolouch discloses tetrafluoroethylene copolymer compositions containing conductive carbon black or graphite fibers to increase conductivity when the tetrafluoroethylene copolymer has been treated with a fluorinating agent.

Carbon black particles can impart specific adverse effects. Such carbon dispersions are difficult to prepare due to carbon gelling, and the resulting layers may deform due to gelatin formation. In addition, the required tolerance in the filler loading to achieve the required range of resistivity is extremely narrow. This, along with the large "batch to batch" variation, leads to the need for extremely tight resistivity control. In addition, carbon filled polymer surfaces have typically had very poor dielectric strength and sometimes significant resistivity dependence on applied fields. This leads to a compromise in the choice of centerline resistivity due to the variability in the electrical properties, which in turn, ultimately leads to a compromise in performance.

U.S. Pat. No. 5,397,863 discloses film capacitors using polyimide materials and fluorinated carbons.

U.S. Pat. No. 5,556,899 discloses adding fluorinated carbon to polyimide materials to effect a change in the dielectric constant and the coefficient of thermal expansion of the polyimide for use in electronic packaging.

U.S. Pat. No. 5,571,852 discloses use of fluorinated carbon in polyimide materials for electrical conductor patterns.

U.S. Pat. No. 5,591,285 discloses adding fluorinated carbon to fluoropolymers and exposing the material to ultraviolet radiation for electronic packaging applications.

There exists a specific need for bias system films which allow for a stable conductivity in the desired resistivity range without the problems associated with ionic additives and carbon additives.

SUMMARY OF THE INVENTION

The present invention provides, in embodiments, a biasable film comprising a fluorinated carbon filled polyimide film, wherein the film is electrically conductive.

The present invention further includes, in embodiments, an electrostatographic machine comprising a biasable member capable of receiving an electrical bias, wherein the biasable member comprises a fluorinated carbon filled polyimide film and wherein the film is electrically conductive.

BRIEF DESCRIPTION OF THE DRAWINGS

For a better understanding of the present invention, reference may be had to the accompanying figures.

DETAILED DESCRIPTION OF THE INVENTION

The present invention relates to biasable members, and in preferred embodiments biasable films, comprising a filled polyimide layer, preferably a fluorinated carbon filled polyimide layer.

Figure 1:
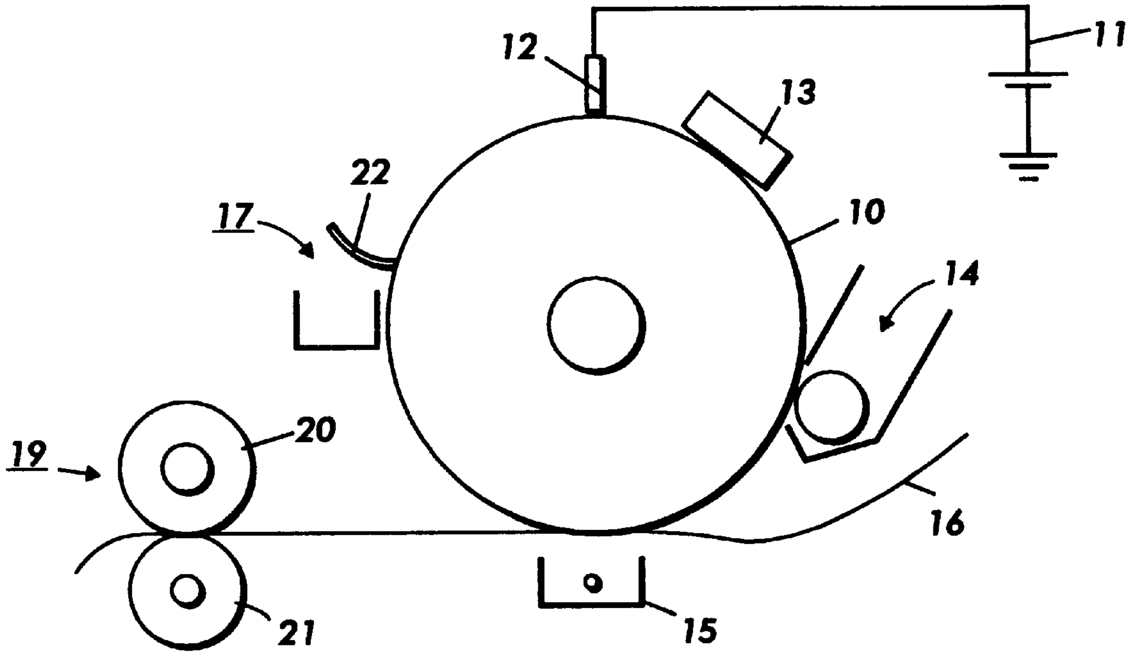
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
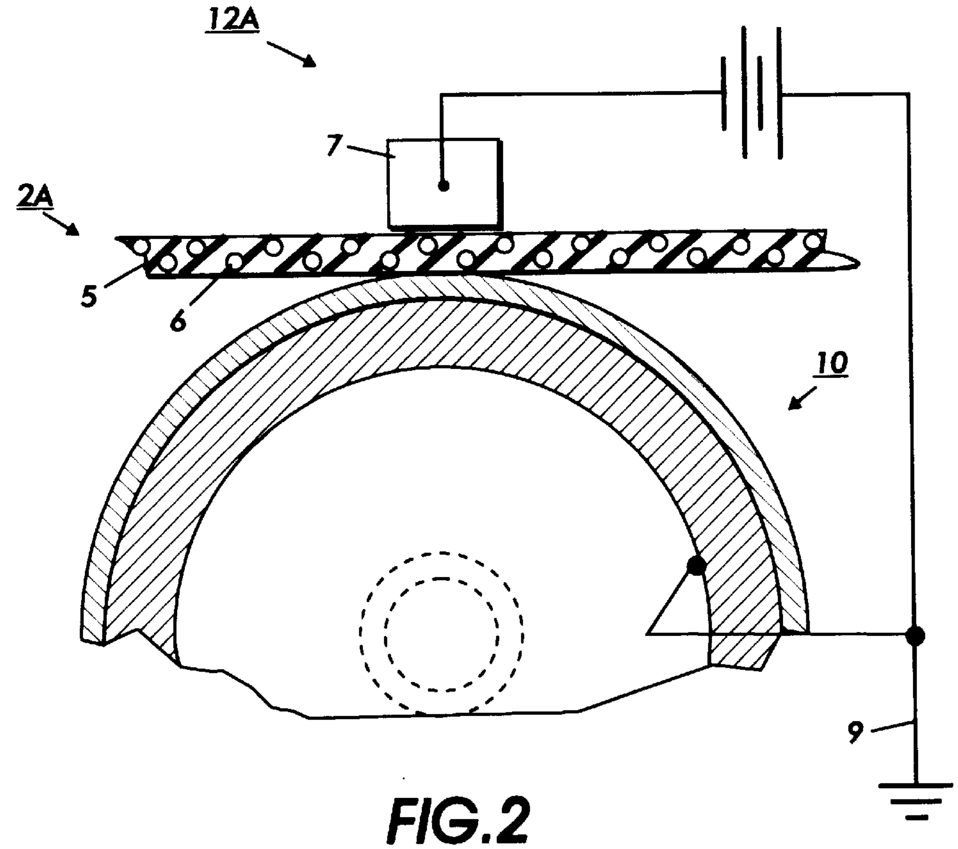
FIG. 2 is a schematic view of an image development system containing a bias charging member.

FIG. 2 demonstrates an embodiment of the present charging system including a bias charging device 12A having a charge belt 2A held in contact with an image carrier implemented as a photoconductive drum 10. However, the present invention can also be used for charging a dielectric receiver or other suitable member to be charged. The photoconductive member may be a drum or a belt or other known photoconductive member. A DC voltage and optional AC current is applied from a power source 9 to the charge belt 2A to cause it to charge the photosensitive member 10. The power is either directly supplied to charge belt 2A or is supplied to charge belt 2A via a bias supplying member 7. The charge belt 2A has a conductive layer 5 such as polyimide, and has conductive particles 6 dispersed therein, such as, for example fluorinated carbon.

Figure 3:
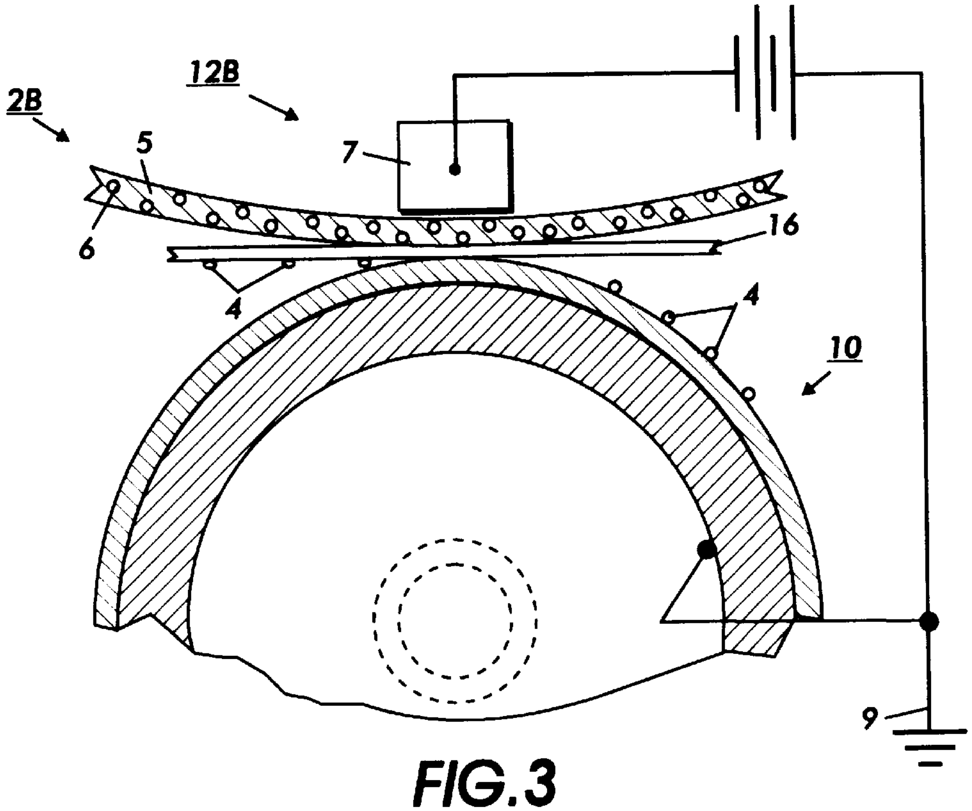
FIG. 3 is a schematic view of an image development system containing a bias transfer member.

FIG. 3 demonstrates an embodiment of the present transfer system including a bias transfer device 12B having a bias transfer belt 2B held in contact with an image carrier implemented as a photoconductive drum 10. The photoconductive member may be in the form of a belt or drum or other suitable photoconductive member. A DC voltage and optional AC current is applied from a power source 9 to the bias transfer belt 2B to cause it to charge the back side of the copy substrate 16 so as to attract toner 4 from photoreceptor 10 to copy substrate 16. The power is either directly supplied to bias transfer belt 2B or is supplied to bias transfer belt 2B via a bias supplying member 7. The bias transfer belt 2B has a conductive layer 5 such as polyimide, and has conductive particles 6 dispersed therein, such as, for example fluorinated carbon.

Figure 4:
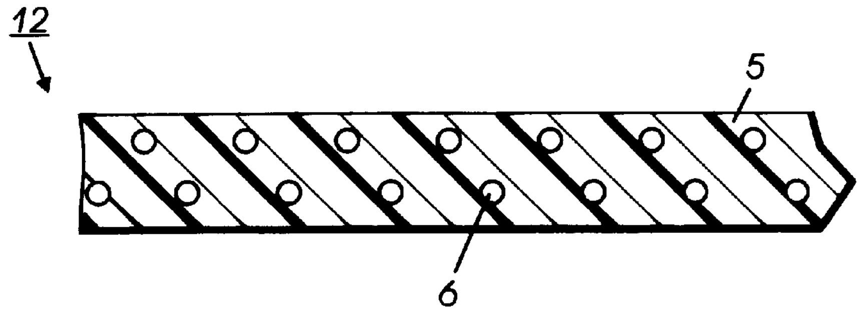
FIG. 4 is a sectional view of an embodiment of the present invention, with a biasable film comprising a fluorinated carbon filled substrate.

FIG. 4 is a sectional view of an embodiment of the present invention, wherein a biasable member 12 is in the form of a belt, sheet or film comprised of a polyimide 5 filled with fluorinated carbon filler 6 is depicted. In this embodiment as shown in FIG. 4, there may be one or more layers of the fluorinated carbon filled polyimide.

Figure 5:
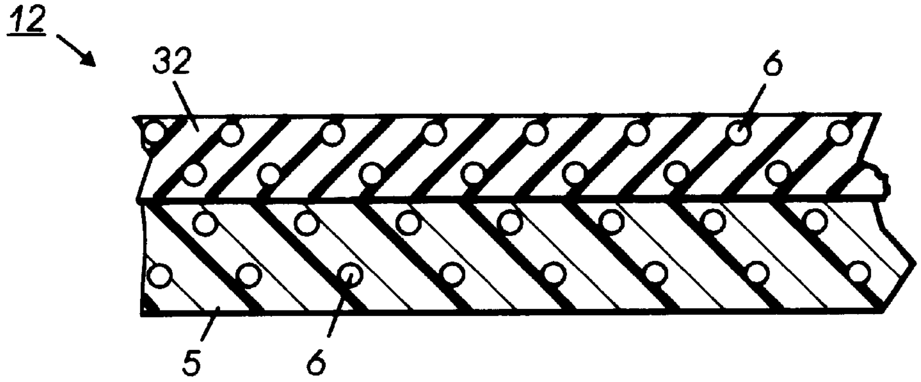
FIG. 5 is a sectional view of an embodiment of the present invention, with a biasable film comprising a fluorinated carbon filled polyimide substrate, and thereover, a fluorinated carbon filled fluoroelastomer.

FIG. 5 is a sectional view of an embodiment of the present invention, showing a two-layer configuration, wherein a biasable film 12 comprises a fluorinated carbon 6 filled polyimide substrate 5, and thereover, a fluoroelastomer layer 32. Preferably, the fluoroelastomer is filled with fluorinated carbon fillers 6.

Figure 6:
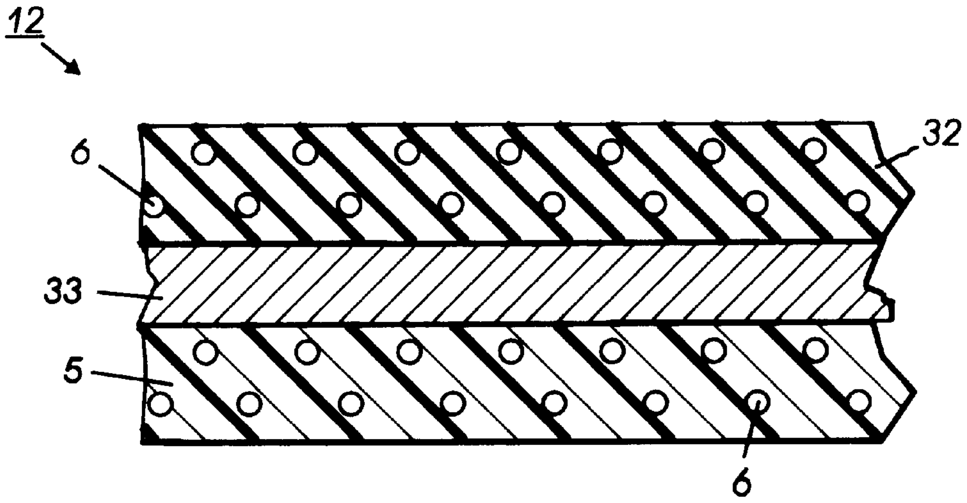
FIG. 6 is a sectional view of an embodiment of the present invention, with a biasable film comprising a fluorinated carbon filled polyimide substrate, a metal intermediate layer, and an outer fluorinated carbon filled fluoroelastomer layer.

FIG. 6 is a sectional view of an embodiment of the present invention, wherein a three-layer configuration of the biasable film 12 is shown, and comprises a fluorinated carbon 6 filled polyimide substrate 5, a metal intermediate layer 33, and an outer conformable layer 32, preferably a fluoroelastomer layer, filled with a conductive filler 6, preferably fluorinated carbon.

Tuning the bias member to the desired resistivity is important in imparting the desired function to the member. The resistivity can be selected not only by using the appropriate curing agents, curing time and curing temperature as set forth herein, but also by selecting a specific fluorinated carbon, or mixtures of various types of fluorinated carbon and selecting the specific fluorinated carbon loading. The percentage of fluorine in the fluorinated carbon will also affect the resistivity of the polymer when mixed therewith.

It is preferable that fluorinated carbon be dispersed in the polyimide layer. Fluorinated carbon, sometimes referred to as graphite fluoride or carbon fluoride, is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systemic, uniform variation of its electrical resistivity properties.

Fluorinated carbon refers to a specific class of compositions which is prepared by reacting fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Moreover, fluoroelastomers are a specific type of fluoropolymer. Thus, despite some possible confusion in the art, it is apparent that fluorinated carbon is neither a fluorocarbon nor a fluoropolymer and the term is used in this context herein.

The fluorinated carbon may include the fluorinated carbon materials as described herein. The methods for preparation of fluorinated carbon are well known and documented in the literature, such as in the following U.S. patents: U.S. Pat. Nos. 2,786,874; 3,925,492; 3,925,263; 3,872,032 and 4,247,608, the entire disclosures each of which are incorporated by reference herein. Essentially, fluorinated carbon is produced by heating a carbon source such as amorphous carbon, coke, charcoal, carbon black or graphite with elemental fluorine at elevated temperatures, such as 150°–600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x representing the number of fluorine atoms and generally being up to about 1.5, preferably from about 0.01 to about 1.5, and particularly preferred from about 0.04 to about 1.4. The formula $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492, the disclosures of which are incorporated by reference herein in their entirety. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N.Y.; Diakin Industries, Inc., New York, N.Y.; and Advance Research Chemicals, Inc., Catoosa, Okla.

Another form of fluorinated carbon which is suitable for use in accordance with the invention is that which has been postulated by Nobuatsu Watanabe as poly(dicarbon monofluoride) which is usually written in the shorthand manner $(C_2F)_n$. The preparation of $(C_2F)_n$ type fluorinated carbon is described, for example, in above-mentioned U.S. Pat. No. 4,247,608, the disclosure of which is herein incorporated by reference in its entirety, and also in Watanabe et al., "Preparation of Poly(dicarbon monofluoride) from Petroleum Coke," Bull. Chem. Soc. Japan, 55, 3197–3199 (1982), the disclosure of which is also incorporated herein by reference in its entirety.

In addition, preferred fluorinated carbons selected include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

The following chart illustrates some properties of four fluorinated carbons of the present invention.

| PROPERTIES | ACCUFLUOR ® | | | | UNITS |
|---|---|---|---|---|---|
| GRADE | 1000 | 2065 | 2028 | 2010 | N/A |
| Feedstock | Coke | Conductive Carbon Black | | | N/A |
| Fluorine Content | 62 | 65 | 28 | 11 | % |
| True Density | 2.7 | 2.5 | 2.1 | 1.9 | g/cc |
| Bulk Density | 0.6 | 0.1 | 0.1 | 0.09 | g/cc |
| Decomposition Temperature | 630 | 500 | 450 | 380 | ° C. |
| Median Particle Size | 8 | 1 | 1 | 1 | micrometers |
| Surface Area | 130 | 340 | 130 | 170 | $m^2/g$ |
| Thermal Conductivity | $10^{-3}$ | $10^{-3}$ | $10^{-3}$ | N.A. | cal/cm-sec-° C. |
| Electrical Resistivity | $10^{11}$ | $10^{11}$ | $10^{8}$ | 10 | ohm-cm |
| Color | Gray | White | Black | Black | N/A |

As has been described herein, an important advantage of the invention is the capability to vary the fluorine content of the fluorinated carbon to permit systematic uniform variation of the resistivity properties of the polyimide layer. The preferred fluorine content will depend on, inter alia, the equipment used, equipment settings, desired resistivity, and the specific fluoroelastomer chosen. The preferred fluorine content in the fluorinated carbon is from about 1 to about 70 weight percent based on the weight of fluorinated carbon (carbon content of from about 99 to about 30 weight percent), preferably from about 5 to about 65 (carbon content of from about 95 to about 35 weight percent), and particularly preferred from about 10 to about 30 weight percent (carbon content of from about 90 to about 70 weight percent).

The median particle size of the fluorinated carbon can be less than 1 micron and up to 10 microns, is preferably less than 1 micron, preferably from about 0.001 to about 1 microns, and particularly preferred from about 0.5 to 0.9 micron. The surface area is preferably from about 100 to about 400 $m^2/g$, preferred of from about 110 to about 340, and particularly preferred from about 130 to about 170 $m^2/g$. The density of the fluorinated carbons is preferably from about 1.5 to about 3 g/cc, and more preferably from about 1.9 to about 2.7 g/cc.

The amount of fluorinated carbon in the polyimide layer is preferably an amount to provide a surface resistivity of from about 1 to about $10^{14}$ ohm/sq, or a bulk resistivity of from about $10^2$ to about $10^{12}$ ohm-cm. For a biasable charging member, the desired surface resistivity is from about $10^4$ to about $10^{13}$ ohm/sq, and preferably from about $10^6$ to about $10^{10}$ ohms/sq; and the desired bulk resistivity is from about $10^2$ to about $10^{11}$ ohm-cm, and preferably from about $10^5$ to about $10^8$ ohm-cm. For a biasable transfer member, the desired surface resistivity is from about $10^7$ to about $10^{14}$ ohm/sq, and preferably from about $10^8$ to about $10^{12}$ ohm/sq; and the desired bulk resistivity is from about $10^5$ to about $10^{12}$ ohm-cm and preferably from about $10^7$ to about $10^{10}$ ohm-cm. Preferably, the amount of fluorinated carbon is from about 1 to about 50 percent by weight, preferably from about 3 to about 30 weight percent, and particularly preferred from about 3 to about 28 weight percent based on the weight of total solids. Total solids as used herein refers to the amount of polyimide, additives, any other fillers, and any other solid materials.

It is preferable to mix different types of fluorinated carbon to tune the mechanical and electrical properties. It is desirable to use mixtures of different kinds of fluorinated carbon to achieve good resistivity, while achieving good mechanical and surface properties. Also, mixtures of different kinds of fluorinated carbon can provide an unexpected wide formulation latitude and controlled and predictable resistivity. For example, an amount of from about 0.1 to about 40 percent, preferably from about 1 to about 40, and particularly preferred of from about 5 to about 35 percent by weight of ACCUFLUOR® 2010 can be mixed with an amount of from about 0.1 to about 40 percent, preferably from about 1 to about 40, and particularly preferred from about 5 to about 35 percent ACCUFLUOR® 2028, and even more particularly preferred from about 6 to about 25 percent ACCUFLUOR® 2028. Other forms of fluorinated carbon can also be mixed. Another example is an amount of from about 0.1 to about 40 percent ACCUFLUOR® 1000, and preferably from about 1 to about 40 percent, and particularly preferred from about 5 to about 35 percent, mixed with an amount of from about 0.1 to about 40 percent, preferably from about 1 to about 40, and particularly preferred from about 1 to about 35 percent ACCUFLUOR® 2065. All other combinations of mixing the different forms of ACCUFLUOR® are possible. A preferred mixture is from about 0.1 to about 15 percent ACCUFLUOR® 2028 mixed with from about 2 to about 3.5 percent ACCUFLUOR® 2010. Another preferred mixture is from about 0.5 to about 10 percent ACCUFLUOR® 2028 mixed with from about 2.0 to about 3.0 percent ACCUFLUOR® 2010. A particularly preferred mixture is from about 1 to about 3 percent ACCUFLUOR® 2028 mixed with from about 2.5 to about 3 percent ACCUFLUOR® 2010, and even more preferred is a mixture of about 3 percent ACCUFLUOR® 2010 and about 2 percent ACCUFLUOR® 2028. All the above percentages are by weight of the total solids.

The fluorinated carbon filled polyimide layer can comprise a polyimide having a suitable high tensile modulus, and preferably, the polyimide is one that is capable of becoming a conductive film upon the addition of electrically conductive particles. The polyimide must be capable of exhibiting high mechanical strength, be flexible, and be resistive. A polyimide having a high tensile modulus is preferred because the high tensile modulus optimizes the film stretch registration. The polyimide used herein has the advantages of improved flex life and image registration, and improved electrical properties including a uniform resistivity within the desired range.

Specific examples of suitable polyimides useful in the fluorinated carbon filled polyimide layer include PAI (polyamideimide), PI (polyimide), polyaramide, polyphthalamide, fluorinated polyimides, polyimidesulfone, polyimide ether, and the like. Specific examples are set forth in U.S. Pat. No. 5,037,587, the disclosure of which is herein incorporated by reference in its entirety.

The polyimides may be synthesized by prepolymer solutions such as polyamic acid or esters of polyamic acid, or by the reaction of a dianhydride and a diamine. Preferred polyamic acids can be purchased from E.I. DuPont.

Suitable dianhydrides include aromatic dianhydrides and aromatic tetracarboxylic acid dianhydrides such as, for example, 9,9-bis(trifluoromethyl) xanthene-2,3,6,7-tetracarboxylic acid dianhydride, 2,2-bis-(3,4-dicarboxyphenyl)-hexafluoropropane dianhydride, 2,2-bis((3,4-dicarboxyphenoxy) phenyl)-hexafluoropropane dianhydride, 4,4'-bis(3,4-dicarboxy-2,5,6-trifluorophenoxy) octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy) phenyl)-ether dianhydride, di-(4 -(3,4-dicarboxyphenoxy) phenyl)-sulfide dianhydride, di-(3,4-dicarboxyphenyl) methane dianhydride, di-(3,4-dicarboxyphenyl)-ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)-propane dianhydride, bis(3,4-dicarboxyphenyl) ether dianhydride, bis(2,3-dicarboxyphenyl) ether dianhydride, bis(3,4-dicarboxyphenyl) sulfone dianhydride, bis(2,3-dicarboxyphenyl) sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1 -bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)-diphthalic dianhydride, 4,4'-(m-phenylenedioxy)diphthalic dianhydride, 4,4'-diphenylsulfidedioxybis(4-phthalic acid) dianhydre 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis-(4-phenyleneoxy-4-phthalic acid) dianhydride, hexafluoroisopropylidenebis-(4-phenyleneoxy-4-phthalic acid) dianhydride, and the like.

Exemplary diamines suitable for use in the preparation of the polyimide include aromatic diamines such as 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3,-bis-(gamma-aminopropyl)-tetramethyldisiloxane, 1,6-diaminohexane, 4,4'-diaminodiphenylmethane, 3,3'-diaminodiphenylmethane, 1,3,-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis [4-(3-aminophenoxy)-phenyl] sulfide, bis [4-(3-aminophenoxy)phenyl] sulfone, bis [4-(3-aminophenoxy)phenyl] ketone, 4,4'-bis(3-aminophenoxy)biphenyl, 2,2-bis [4-(3-aminophenoxy) phenyl]-propane, 2,2-bis [4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl) ethane, 2,2-di(p-aminophenyl)propane, and 2,2-di(p-aminophenyl)-1,1,1,3,3,3-hexafluoropropane.

The dianhydrides and diamines are preferably used in a weight ratio of dianhydride to diamine of from about 20:80 to about 80:20, and preferably about 50:50 weight ratio. The above aromatic dianhydride (preferably aromatic tetracarboxylic acid dianhydride) and diamine (preferably aromatic diamine) are used singly or as a mixture, respectively. The polyimide can be prepared from the dianhydride and diamine by known methods. For example, the dianhydride and the diamine can be suspended or dissolved in an organic solvent as a mixture or separately and can be reacted to form the polyamic acid, which is thermally or chemically dehydrated and the product is separated and purified. The polyimide is heat-melted with a known extruder, delivered in the form of a film from a die having a slit nozzle, and a static charge is applied to the film, the film is cooled and solidified with a cooling roller having a surface temperature in the range of glass transition temperature (Tg) of the polymer (Tg)–50° to (Tg)–15° C, transmitted under tension without bringing the film into contact with rollers while further cooling to the room temperature, and wound up or transferred to a further step.

In a preferred embodiment of the invention, the fluorinated carbon is added to a polyimide prepolymer, such as polyamic acid, in solution, and subsequently formed into a layer, sheet, film, or the like. The prepolymer/fluorinated carbon solution can then be processed by known procedures such as roll and/or ball milling, drying and curing. Processes for preparing polyimide/fluorinated carbon solutions from polyimide prepolymers are disclosed in U.S. Pat. Nos. 5,591,285 and 5,571,852. The disclosures of each of these patents are hereby incorporated by reference in their entirety.

As a preferred procedure for generating the polyimide substrates, the polyamic acid solutions (or prepolymer solutions) can be prepared by reacting a diamine, such as oxydianiline, with a tetracarboxylic acid dianhydride, such as hydromellitic dianhydride or benzophenone tetracarboxylic acid dianhydride in a solvent, such as N-methylpyrrolidine (NMP) or N,N-dimethylacetamide in a dry inert atmosphere. The mixture is usually stirred overnight (about 8 hours) or heated to reflux if required to form the polyamic acid solution. The solid content ranges from about 10 to about 20% by weight. The fluorinated carbon is then added. A paint shaker or roll mill can be used to aid in the dispersion process. The substrates can be prepared by first making a film from the fluorinated carbon/polyamic acid dispersion followed by curing the film to fully imidize the precursor polymer. Processes used to coat the film are well-known in the art and include spin-casting, solution coating, extrusion, hot-mold, and other known methods. The coated films can be heated at 100° C. for about 1 to about 2 hours to remove the solvent, and then cured at 200° C. for about 2 to 3 hours. The films can then be imidized at 350° C. for about 1 to 2 hours. The polyimide/fluorinated carbon films can then be formed into a layer or an endless seamless belt.

There are other polyimides which may be prepared as fully imidized polymers which do not contain any "amic" acid and do not require high temperature cure to convert them to the imide form. A typical polyimide of this type may be prepared by reacting di-(2,3-dicarboxyphenyl)-ether dianhydride with 5-amino-1-(p-aminophenyl)-1,3.3-trimethylindane. This polymer is available as Polyimide XU 218 sold by Ciba-Geigy Corporation, Ardsley, N.Y. Other fully imidized polyimides are available from Lenzing, USA corporation in Dallas, Tex. and are sold as Lenzing P 83 polyimide and by Mitsui Toatsu Chemicals, New York, N.Y. sold as Larc-TPI. These fully imidized polyimides are first dissolved in a solvent such as dimethylformamide, dimethylpyrralidone, dimethylacetamide and then combined with the fluorinated carbon as discussed above to be formed into a layer, sheet, film or the like. Evaporation of the solvent produces a film, sheet, or layer without high temperature exposure typically required for conversion of the amic acid to an imide polymer structure.

The polyimide is present in the fluorinated carbon filled polyimide substrate in an amount of from about 50 to about 99 percent by weight of total solids, preferably from about 99 to about 60, and particularly preferred from about 95 to about 30 percent by weight of total solids. Total solids includes the total percentage by weight (equal to 100%) of polyimide, fluorinated carbon, any additional fillers and any additives in the layer.

In the two layer configuration, an embodiment of which is depicted in FIG. 5, the outer layer is preferably a fluorocarbon layer. Preferably, the fluorocarbon is a fluoroelastomer. In a particularly preferred embodiment, the fluorocarbon is filled with a filler, preferably a fluorinated carbon filler.

Examples of fluoroelastomers include those described in detail in U.S. Pat. Nos. 5,166,031, 5,281,506, 5,366,772 and 5,370,931, together with U.S. Pat. Nos. 4,257,699, 5,017,432 and 5,061,965, the disclosures of which are incorporated by reference herein in their entirety. As described therein these fluoroelastomers, particularly from the class of copolymers and terpolymers of vinylidenefluoride, hexafluoropropylene and tetrafluoroethylene, are known commercially under various designations as VITON A®, VITON E®, VITON E60C®, VITON E430®, VITON 911®, VITON GH®, VITON B50®, VITON E45®, and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylenetetrafluoroethylene) and FLUOREL II® (LII900) a poly (propylenetetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company.

Preferred fluoroelastomers are those which contain hexafluoropropylene and tetrafluoroethylene as comonomers. Two preferred known fluoroelastomers are (1) a class of copolymers of vinylidenefluoride and hexafluoropropylene known commercially as VITON A® and (2) a class of terpolymers of vinylidenefluoride, hexafluoropropylene and tetrafluoroethylene known commercially as VITON B®.

In another preferred embodiment, the fluoroelastomer is one having a relatively low quantity of vinylidenefluoride, such as in VITON GF®. The VITON GF® is a tetrapolymer having 35 mole percent of vinylidenefluoride, 34 mole percent of hexafluoropropylene and 29 mole percent of tetrafluoroethylene with 2 percent cure site monomer. Examples of cure site monomers include 4-bromoperfluorobutene-1, 1,1 -dihydro-4-bromoperfluorobutene-1, 3-bromoperfluoropropene-1, 1,1-dihydro-3-bromoperfluoropropene-1, and commercially available cure site monomers available from, for example, DuPont.

Examples of fluoroelastomers suitable for use herein for the conformable layers include elastomers of the above type, along with volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures each of which are herein incorporated by reference in their entirety.

Volume graft, in embodiments, refers to a substantially uniform integral interpenetrating network of a hybrid composition, wherein both the structure and the composition of the fluoroelastomer and polyorganosiloxane are substantially uniform when taken through different slices of the biasable member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer.

In embodiments, the polyorganosiloxane having functionality according to the present invention has the formula:

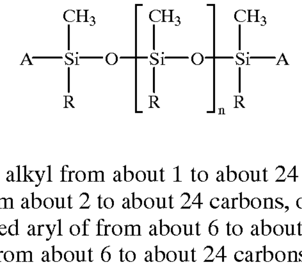

where R is an alkyl from about 1 to about 24 carbons, or an alkenyl of from about 2 to about 24 carbons, or a substituted or unsubstituted aryl of from about 6 to about 18 carbons; A is an aryl of from about 6 to about 24 carbons, a substituted or unsubstituted alkene of from about 2 to about 8 carbons, or a substituted or unsubstituted alkyne of from about 2 to about 8 carbons; and n represents the number of segments and is, for example, from about 2 to about 400, and preferably from about 10 to about 200 in embodiments.

In preferred embodiments, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

The amount of fluoroelastomer used to provide the surface layer of the present invention is dependent on the amount necessary to form the desired thickness of the layer or layers of surface material. Specifically, the fluoroelastomer is added in an amount of from about 50 to about 99 percent, preferably about 70 to about 99 percent by weight of total solids. Preferably, a conductive filler such as, for example, fluorinated carbon is present in the outer layer in an amount of from about 1 to about 50, and preferably from about 1 to about 30 percent by weight based on the weight of total solids.

The outer conformable layer 32 as depicted in FIG. 5, has a thickness of from about 1 to about 10 mil, preferably from about 2 to about 5 mil. The hardness of the conformable outer layer is from about 30 to about 80 Shore A, and preferably from about 35 to about 75 Shore A. It is preferred that the relaxable, conformable outer layer have a resistivity matching that of the fluorinated carbon filled polyimide substrate.

In a preferred embodiment of the invention, the conformable layer contains a filler such as carbon black, graphite, fluorinated carbon as described herein, a metal powder, a metal oxide such as tin oxide, or a mixture thereof. Preferred fillers include fluorinated carbons as described herein.

In the embodiment shown in FIG. 6, preferred metals for the intermediate layer 34 include stainless steel, aluminum, copper, iron, nickel and alloys thereof. A preferred metal is aluminum. In this configuration, a field can be created by biasing the metal layer which can enhance electrostatic transfer.

Preferred polymers for the outer conformable layer of a three layer configuration, an embodiment of which is depicted in FIG. 6, include the above fluoropolymers and volume grafted materials set forth for use as the outer conformable layer in the two-layer configuration, and the polyimides listed for use as the substrate in the one-layer configuration of FIG. 4.

The substrate 5 of the three layer configuration can be any mechanically strong substrate and is not limited to polyimide. The substrate can be polyimide, polysulfone, polyester, polyamide, polyether imide, polyarylate, nylons, polycarbonates, polyphthalamide, and the like.

In the two-layer and three-layer embodiments, the outer layer(s) is/are coated on the substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, flow coating such as that described in U.S. application Ser. No. 08/669,761, filed Jun. 26, 1996, entitled, "Leveling Blade for Flow Coating Process for Manufacture of Polymeric Printer Roll and Belt Components," U.S. application Ser. No. 08/672,493, filed Jun. 26, 1996, entitled, "Coating Process for Manufacture of Polymeric Printer Roll and Belt Components," and U.S. application Ser. No. 08/822,521, filed Mar. 24, 1997, entitled, "Flow Coating Solutions and Fuser Member Layers Prepared Therewith," and the like. It is preferred to spray or flow or roll coat the outer material.

In embodiments as depicted in FIG. 6, wherein a metal layer is formed on another layer, the metal layer is preferably deposited by vacuum deposition technique.

Any suitable adhesive or other suitable conductive layer (s) may be present between any of the layers in any of the embodiments disclosed.

The biasable member employed for the present invention can be of any suitable configuration. Examples of suitable configurations include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, and the like. It is preferred that the substrate be an endless seamed flexible belt or seamed flexible belt, which may or may not include puzzle cut seams. Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method for manufacturing reinforced seamless belts is set forth in U.S. Pat. No. 5,409,557, the disclosure of which is hereby incorporated by reference in its entirety.

A bias can be supplied to the biasable member in various ways. A bias may be supplied to the biasable member through another biasable member such as a biasable supplying member (for example, element 7 in FIGS. 2 and 3) capable of receiving a bias from an electrical bias source, wherein the electrical bias source is connected to the bias supplying member for directing or supplying electrical current thereto, and wherein the bias supplying member is capable of transferring or supplying the charge to the bias charging member or bias transfer member. The biasable supplying member may be in direct contact or in charging contact with said biasable transfer or biasable charging member so that the biasable charging member or biasable transfer member is capable of receiving and transferring or spraying the charge to a substrate, such as a photoreceptor or copy substrate. In an alternative embodiment, the bias may be directly supplied to the bias charging member or bias transfer member.

In a preferred embodiment, the biasable member is in the form of a belt, sheet or film and the bias is applied through shafts, for example, stainless steel shafts. One advantage of using a belt embodiment, is that one can engineer a larger pre-nip and post-nip region. For AC/DC operation, when a DC bias has exceeded a certain limit, micro-corona may be generated in both the pre-nip and the post-nip regions, which may result in charging of the photoreceptor. A larger pre-nip and post-nip region can increase the efficiency of photoreceptive charging. Therefore, a belt configuration for the biasable member is preferred.

The bias is typically controlled by use of a DC potential, and an AC potential is typically used along with the DC controlling potential to aid in charging control. The advantage of using AC lies in the reduction of the surface contamination sensitivity and to ensure that the charging is uniform. The AC creates a corona in the pre- and post-nip regions of the devices so that the charging component related to the charge injection in the nip is less important. The AC bias system is proportional to the process speed. This sometimes limits the application of bias devices to low speed machines. Use of AC in addition to DC increases the cost of the system. Therefore it is desirable to use only a DC. However, use of only DC bias usually requires materials with an optimum, stable resistivity. Otherwise, use of a single DC bias will result in charging non-uniformity and pre-nip breakdown.

Since the present surfaces, in embodiments, allow for optimum and stable resistivities as set forth herein, the biasable member of the present invention may only include a DC bias charging system, without the need for an AC bias. In addition, the present invention can be used with electroded field tailoring with an electroded substrate, or with double bias field tailoring without electrodes. These latter two approaches are useful with a stationary film charging system or bias transfer films.

Also, in embodiments, the present invention may be used in double bias systems, such as electroded and/or non-electroded rollers or film chargers. This allows for selective tuning of the system to post-nip breakdown, thereby improving the charge uniformity. Post-nip breakdown is more uniform than pre-nip breakdown. By choosing a specific material for the outer layer of the biasable member such as described herein, the resistivity can be set within the desired range so that only post-nip breakdown occurs. Further, by biasing post-nip and pre-nip differently, post-nip discharge can be achieved. The term in the art for selectively biasing post-nip is referred to as field tailoring.

Specific embodiments of the invention will now be described in detail. These examples are intended to be illustrative, and the invention is not limited to the materials, conditions, or process parameters set forth in these embodiments. All parts are percentages by solid weight unless otherwise indicated.

EXAMPLES

Example 1

Prototype resistive fluorinated polyimide layers containing fluorinated carbon ACCUFLUOR® 2028 were prepared in the following manner. About 0.8 grams of ACCUFLUOR® 2028 was dispersed ultrasonically in 10 grams of N-methylpyrrolidine (NMP) for about 10 minutes. This dispersion was then combined with 50 grams of a polyamic acid solution (PI-2566, 16.9% solid content, from E.I. DuPont) inside a 4 ounce bottle and the mixture was homogenized on a paint shaker for approximately 45 minutes. A prototype fluorinated polyimide resistive layer was then applied by coating the above dispersion onto a KAPTON® substrate on a Gardner Laboratory Coater with a 0.01 mil draw bar. The coated layer was then dried at 80° C. for approximately 1 hour, and cured at 235° C. for about 3 to 4 hours and at approximately 350° C. for about 0.5 hours, resulting in a 1 mil thick fluorinated polyimide layer. The fluorinated carbon loading in the layer was determined to be about 8.6 percent by weight of total solids.

The surface resistivity of the fluorinated polyimide layer was measured by a Xerox Corporation testing apparatus consisting of a power supply (Trek 601C Coratrol), a Keithy electrometer (model 610B) and a two point conformable guarded electrode probe (15 mm spacing between the two electrodes). The field applied for the measurement was 1500 V/cm and the measured current was converted to surface resistivity based on the geometry of the probe. The surface resistivity of the layer was determined to be about $1.7\times10^{11}$ ohm/sq.

The volume resistivity of the layer was determined by the standard AC conductivity technique. In this Example the layer was coated onto a stainless steel substrate. An evaporated aluminum thin film (300 Å) was used as the counter electrode. The volume resistivity was found to be approximately $5\times 10^{9}$ ohm-cm at an electric field of 1500 V/cm. Surprisingly, the resistivity was found to be substantially insensitive to changes in temperature in the range of about 20° C. to about 150° C., to changes in relative humidity in the range of about 20% to about 80%, and to the intensity of applied electric field (up to 5,000 V/cm). Furthermore, no hysteresis (memory) effect was seen after the layer was cycled to higher electric fields ($>10^{4}$ V/cm).

Example 2

A number of fluorinated polyimide resistive layers were prepared using the above procedure of Example 1. Varying resistives were obtained by changing the concentration of the ACCUFLUOR® loading. The results are shown in Table 2 below.

TABLE 2

| ACCUFLUOR ® 2028 (percent) | Surface Resistivity (ohm/sq) | Volume Resistivity (ohm-cm) |
|---|---|---|
| 7.6% | $\sim1\times10^{15}$ | $\sim8\times10^{14}$ |
| 9.1% | $\sim3.8\times10^{10}$ | |
| 9.6% | $\sim8.2\times10^{8}$ | $\sim9\times10^{6}$ |
| 10.6% | $\sim7.6\times10^{7}$ | $\sim3\times10^{5}$ |

Example 3

A number of polyimide resistive layers were prepared and evaluated using the above procedure of Example 1 with the exception that polyamic acid solution PI2808 (from E.I. DuPont) was used in place of PI2566. The surface resistivity results are shown in Table 3 below.

TABLE 3

| ACCUFLUOR ® 2028 (percent) | Surface Resistivity (ohm/sq) |
|---|---|
| 8.5% | ~1 × $10^{14}$ |
| ~9% | ~6.4 × $10^{12}$ |
| 11% | ~1.5 × $10^{9}$ |
| 12% | ~2.0 × $10^{6}$ |
| 13% | ~2.5 × $10^{6}$ |
| 15% | ~2 × $10^{6}$ |

Example 4

A bias charging belt consisting of a fluorinated carbon in a fluoropolyimide can be fabricated in the following manner. A coating dispersion containing ACCUFLUOR® 2028 and fluoropolyimide in a weight ratio of about 1 to about 9.4 can be prepared according to the procedures outlined in Example 1. An approximately 3 ml thick ACCUFLUOR® 2028/polyimide resistive layer can be prepared by spin casting the dispersion on a roll substrate. The resistive layer, after cured as described in Example 1, is estimated to have a surface resistivity of approximately $7.6 \times 10^7$ ohm/sq.

Example 5

A bias transfer belt comprising a fluorinated carbon dispersed in a fluoropolyimide can be fabricated according to Example 4, with the exception that the ratio between the fluorinated carbon and the fluoropolyimide is about 1 to 10. The surface resistivity of the belt is estimated to be about $3.8 \times 10^{10}$ ohm/sq.

Example 6

A two-layer bias transfer belt comprising a conformable resistive outer layer and a resistive substrate layer of Example 5 can prepared according to the procedure outlined below.

First, a coating dispersion comprising ACCUFLUOR® 2028, ACCUFLUOR® 2010 and VITON® GF in a weight ratio of about 2:3:95 was prepared. The coating dispersion was prepared by first adding a solvent (200 grams of methyl ethyl ketone), a steel shot (2,300 grams), 0.95 grams ACCUFLUOR® 2028 and 1.42 grams ACCUFLUOR® 2010 in a small bench top attritor (model 01A). The mixture was stirred for about one minute so as to wet the fluorinated carbon. A polymer binder, VITON® GF (45 grams) was then added and the resulting mixture was attrited for 30 minutes. A curative package (2.25 grams VC-50, 0.9 grams Maglite-D and 0.2 grams $Ca(OH)_2$) and a stabilizing solvent (10 grams methanol) were then introduced and the resulting mixture was further mixed for another 15 minutes. After filtering the steel shot through a wire screen, the dispersion was collected in a polypropylene bottle. The resulting dispersion was then coated onto KAPTON® substrates within about 2 to 4 hours using a Gardner Laboratory Coater. The coated layers were air-dried for approximately two hours and then step heat cured in a programmable oven. The heating sequence was as follows: (1) 65° C. for 4 hours, (2) 93° C. for 2 hours, (3) 144° C. for 2 hours, (4) 177° C. 2 hours, (5) 204° C. for 2 hours, and (6) 232° C. for 16 hours. This resulted in a VITON® GF layer containing about 30 percent by weight ACCUFLUOR® 2028. The dry thickness of the layers was determined to be approximately 3 mil (about 75 μm). The hardness of this layer was estimated to be about 65 Shore A and the surface resistivity was about $1 \times 10^{10}$ ohm/sq.

Example 7

A two-layer bias charging belt comprising a conformable resistive layer and a resistive layer of Example 4 can be prepared according to the procedure outlined below.

First, a coating dispersion comprising ACCUFLUOR® 2010 and VITON® GF in a weight ratio of about 3:97 was prepared. The coating dispersion was prepared by first adding a solvent (200 grams of methyl ethyl ketone), a steel shot (2,300 grams), and 1.39 grams ACCUFLUOR® 2010 in a small bench top attritor (model 01A). The mixture was stirred for about one minute so as to wet the fluorinated carbon. A polymer binder, VITON® GF (45 grams) was then added and the resulting mixture was attrited for 30 minutes. A curative package (2.25 grams VC-50, 0.9 grams Maglite-D and 0.2 grams $Ca(OH)_2$) and a stabilizing solvent (10 grams methanol) were then introduced and the resulting mixture was further mixed for another 15 minutes. After filtering the steel shot through a wire screen, the dispersion was collected in a polypropylene bottle. The resulting dispersion was then coated onto KAPTON® substrates within about 2 to 4 hours using a Gardner Laboratory Coater. The coated layers were air-dried for approximately two hours and then step heat cured in a programmable oven. The heating sequence was as follows: (1) 65° C. for 4 hours, (2) 93° C. for 2 hours, (3) 144° C. for 2 hours, (4) 177° C. 2 hours, (5) 204° C. for 2 hours, and (6) 232° C. for 16 hours. This resulted in a VITON® GF layer containing about 3 percent by weight ACCUFLUOR® 2010. The dry thickness of the layers was determined to be approximately 3 mil (about 75 μm). The hardness of this layer was estimated to be about 63 Shore A and the surface resistivity was about $1.7 \times 10^8$ ohm/sq.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A biasable film comprising a fluorinated carbon filled polyimide film and an outer fluorocarbon layer on said fluorinated carbon filled polyimide film, wherein said biasable film is electrically conductive and is capable of receiving a bias.

2. A biasable film in accordance with claim 1, wherein said fluorinated carbon is present in an amount of from about 1 to about 30 percent by weight based on the weight of total solids.

3. A biasable film in accordance with claim 1, wherein said fluorinated carbon has a fluorine content of from about 1 to about 70 weight percent based on the weight of fluorinated carbon, and a carbon content of from about 99 to about 30 weight percent based on the weight of fluorinated carbon.

4. A biasable film in accordance with claim 1, wherein the fluorinated carbon is of the formula $CF_x$, wherein x represents the number of fluorine atoms and is a number of from about 0.01 to about 1.5.

5. A biasable film in accordance with claim 1, wherein said fluorinated carbon is selected from the group consisting of a fluorinated carbon having a fluorine content of about 62 weight percent, a fluorinated carbon having a fluorine content of about 11 weight percent, a fluorinated carbon having a fluorine content of about 28 weight percent, and a fluorinated carbon having a fluorine content of about 65 weight percent based on the weight of fluorinated carbon.

6. A biasable film in accordance with claim 1, wherein the polyimide is selected from the group consisting of polyamideimide, polyarylamide, polyphthalamide, fluorinated polyimides, polyimidesulfone, and polyimide ether.

7. A biasable film in accordance with claim 6, wherein said polyimide is a fluorinated polyimide.

8. A biasable film in accordance with claim 1, wherein the polyimide is generated from the reaction product of a dianhydride with a diamine.

9. A biasable film in accordance with claim 8, wherein said dianhydride is an aromatic dianhydride.

10. A biasable film in accordance with claim 9, wherein said dianhydride is selected from the group consisting of 9,9-bis(trifluoromethyl) xanthene-2,3,6,7-tetracarboxylic acid dianhydride, 2,2-bis-(3,4-dicarboxyphenyl)-hexafluoropropane dianhydride, 2,2-bis((3,4-dicarboxyphenoxy) phenyl)-hexafluoropropane dianhydride, 4,4'-bis(3,4-dicarboxy-2,5,6-trifluorophenoxy) octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy) phenyl)-ether dianhydride, di-(4-(3,4-dicarboxyphenoxy) phenyl)-sulfide dianhydride, di-(3,4-dicarboxyphenyl) methane dianhydride, di-(3,4-dicarboxyphenyl)-ether dianhydride, 1,2,4,5-tetracarboxybenzene dianhydride, and 1,2,4-tricarboxybenzene dianhydride.

11. A biasable film in accordance with claim 8, wherein said diamine is selected from the group consisting of 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3,-bis-(gamma-aminopropyl)-tetramethyldisiloxane, 1,6-diaminohexane, 4,4'-diaminodiphenylmethane, 3,3'-diaminodiphenylmethane, 1,3,-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, and 4,4'-diamino-2,2',3,3',5,5',6,6'-octafluorodiphenyl ether.

12. A biasable film in accordance with claim 1, wherein said outer layer comprises a fluoroelastomer.

13. A biasable film in accordance with claim 12, wherein said fluoroelastomer is selected from the group consisting of a) copolymers of vinylidenefluoride, hexafluoropropylene and tetrafluoroethylene; b) terpolymers of vinylidenefluoride, hexafluoropropylene and tetrafluoroethylene, and c) tetrapolymers of vinylidenefluoride, hexafluoropropylene, tetrafluoroethylene and a cure site monomer.

14. A biasable film in accordance with claim 12, wherein said fluroelastomer comprises a filler selected from the group consisting of fluorinated carbon, carbon black, graphite, metal powder, metal oxide, and mixtures thereof.

15. A biasable film in accordance with claim 14, wherein said filler is fluorinated carbon of the formula $CF_x$, wherein x represents the number of fluorine atoms and is a number of from about 0.01 to about 1.5.

16. A biasable film in accordance with claim 1, further comprising an intermediate layer comprising a metal and positioned on said fluorinated carbon filled polyimide, and an outer polymer layer positioned on said intermediate layer.

17. A biasable film in accordance with claim 16, wherein said intermediate layer comprises a metal selected from the group consisting of aluminum, copper, stainless steel, nickel and iron.

18. A biasable film in accordance with claim 16, wherein said outer polymer layer comprises a polymer selected from the group consisting of fluoroelastomers, polyimides, polysulfones, polyesters, polyamides, polyarylates, and polycarbonates.

19. A biasable film in accordance with claim 16, wherein said outer polymer layer comprises a filler selected from the group consisting of fluorinated carbon, carbon black, graphite, metal powder, metal oxide, and mixtures thereof.

20. A biasable film in accordance with claim 19, wherein the filler is a fluorinated carbon of the formula $CF_x$, wherein x represents the number of fluorine atoms and is a number of from about 0.01 to about 1.5.

21. A biasable film in accordance with claim 16, wherein said polyimide of said fluorinated carbon filled polyimide layer is the reaction product of a dianhydride and a diamine.

22. A biasable film in accordance with claim 1, wherein said fluorinated carbon filled polyimide layer is generated from the reaction product of a polyimide prepolymer and fluorinated carbon.

23. A biasable film in accordance with claim 22, wherein said polyimide prepolymer is a polyamic acid.

24. A biasable film in accordance with claim 1, wherein the electrically conductive film is biased by a DC bias potential.

25. A biasable film in accordance with claim 1, wherein the electrically conductive film is biased by a DC and an AC bias potential.

26. A biasable film in accordance with claim 1, wherein the electrically conductive film is in the form of an endless belt.

27. A biasable film in accordance with claim 1, wherein said film has a surface resistivity of from about $10^4$ to about $10^{14}$ ohms/sq.

28. An electrostatographic machine comprising a biasable member capable of receiving an electrical bias, wherein said biasable member comprises a fluorinated carbon filled polyimide film and wherein said film is electrically conductive.

29. The electrostatographic machine of claim 28, wherein said biasable member is adapted for providing charge to an imaging surface.

30. The electrostatographic machine of claim 29, wherein said fluorinated carbon filled polyimide film has a surface resistivity of from about $10^4$ to about $10^{13}$ ohm/sq.

31. The electrostatographic machine of claim 30, wherein said surface resistivity is from about $10^6$ to about $10^{10}$ ohm/sq.

32. The electrostatographic machine of claim 28, wherein said biasable member is adapted for transferring toner particles from an image support surface to a copy substrate.

33. The electrostatographic machine of claim 32, wherein said fluorinated carbon filled polyimide film has a surface resistivity of from about $10^7$ to about $10^{14}$ ohm/sq.

34. The electrostatographic machine of claim 33, wherein said surface resistivity is from about $10^8$ to about $10^{12}$ ohm/sq.

35. The electrostatographic machine of claim 28, further comprising a bias supplying member and an electrical bias source connected to said bias supplying member for providing electrical current thereto, wherein said bias supplying member is capable of contacting said biasable member.

* * * * *